United States Patent [19]

Chang

[11] Patent Number: 4,685,772

[45] Date of Patent: Aug. 11, 1987

[54] TUNABLE ACOUSTO-OPTIC FILTER WITH IMPROVED SPECTRAL RESOLUTION AND INCREASED APERTURE

[75] Inventor: I-Cheng Chang, Sunnyvale, Calif.

[73] Assignee: The United States of America as represented by the Secretary of the Air Force, Washington, D.C.

[21] Appl. No.: 727,507

[22] Filed: Apr. 26, 1985

Related U.S. Application Data

[63] Continuation-in-part of Ser. No. 452,603, Dec. 23, 1982, abandoned.

[51] Int. Cl.$^4$ ............................................. G02F 1/11
[52] U.S. Cl. ..................................................... 350/372
[58] Field of Search ............................. 350/371–372, 350/358

[56] References Cited

U.S. PATENT DOCUMENTS

| | | | |
|---|---|---|---|
| 3,944,335 | 3/1976 | Saito et al. | 350/373 |
| 4,037,933 | 7/1977 | Yano et al. | 350/358 |
| 4,342,502 | 8/1982 | Chang | 350/358 |

FOREIGN PATENT DOCUMENTS

| | | | |
|---|---|---|---|
| 2021204 | 8/1980 | Fed. Rep. of Germany | 350/358 |

OTHER PUBLICATIONS

Chang, I. C., "Acousto-Optic Tunable Filters", Optical Engineering, 11, 12-81, pp. 824–829.
Watanabe et al, "TeO$_2$ Acousto-Optic Tunable Filter", Oyo Buturi (Japan), vol. 44, Suppl. 1975, pp. 127–131.

*Primary Examiner*—William H. Punter
*Attorney, Agent, or Firm*—Jacob N. Erlich; Donald J. Singer

[57] ABSTRACT

A transverse configuration, electronically tunable acousto-optic filter assembly with improved spectral resolution and increased aperture. The crystal prism member is made of TeO$_2$ and has a large prism angle (i.e., close to 90 degrees). An acousic prism coupler member made of material with low acoustic velocity (such as TeO$_2$, AsS$_3$, or GeAsSe), to avoid total internal reflection of the interface, is bonded in optical contact with a face of the crystal prism member which defines one extreme of the large prism angle, and which is not traversed by a polarized light beam that is transmitted through the crystal prism member and that interacts with a generated, perpendicularly directed, acoustic wave. The use of the acoustic prism couple member, togther with the use of a large prism angle in the crystal prism member, result in high spectral resolution and large aperture of the filter assembly and its desired useability in the infrared region.

8 Claims, 4 Drawing Figures

TUNABLE ACOUSTO-OPTIC FILTER WITH IMPROVED SPECTRAL RESOLUTION AND INCREASED APERTURE

STATEMENT OF GOVERNMENT INTEREST

The invention described herein may be manufactured and used by or for the Government for governmental purposes without the payment of any royalty thereon.

BACKGROUND OF THE INVENTION

This application is a continuation-in-part of co-pending patent application Ser. No. 452,603 filed on Dec. 23, 1982 and now abandoned.

This invention relates to acousto-optic filters and, more particularly, to an electrically tunable acousto-optic filter assembly which utilizes the noncollinear interaction of light (i.e., polarized light in this instance) and acoustic beam in an acoustically anisotropic, optically birefringent, medium to attain improved spectral resoluton and increased aperture of the filter assembly.

It is to be remembered that in a noncollinear filter the light (i.e., optical) beams within the acoustically anisotropic, optically birefringent medium (such as in a birefringent, crystal, and hereinafter referred to as such) are noncollinear with the acoustic (i.e., sound) beam. The most significant feature of the noncollinear acousto-optic filter is that a narrow filter bandpass can be maintained for a relatively large cone of incident light. This large angular aperture characteristic is due to the proper choice of acousto-optic geometry, wherein the tangents to the locus of the incident and diffracted light wavevectors are parallel. Hereinafter, "tunable acousto-optic filter" will be defined as the type of optical filter that operates on the basis of acousto-optic diffraction satisfying the "parallel tangents" condition. This type of nonlinear tunable acousto-optic filter is described by the present inventor on pages 370-372 of the October 1974 issue of the Applied Physics Letters, Vol. 25, No. 7 and in U.S. Pat. No. 4,052,121 entitled "Non-collinear Acousto-Optic Filter." Such tunable acousto-optic filters are clearly distinguishable from the type with small angular aperture as described in U.S. Pat. Nos. 3,944,334, 3,944,335 and 3,953,107, all of which rae entitled "Acousto-Optic Filters."

Additionally, it is to be remembered that the more restrictive term "transverse configuration" is intended to mean herein, as it does it the art, that the acoustic (sound) beam is perpendicular to the light (optical) beams. More specifically, and more accurately, it is the energy flow direction (i.e., the group velocity) of the acoustic wave which is perpendicular to the light beams and, of course, vice-versa. In this regard more detailed technical information is readily available in U.S. Pat. No. 4,342,502, entitled "Transverse Tunable Acousto-Optic Filter".

One of the major difficulties in the practical implementation of tunable acousto-optic filters (hereinafter referred to as TAOF) is the limited aperture available. The optical aperture of an acousto-optic filter is limited by the drive power. This is particularly serious in the infrared region, since the drive power required is proportional to the square of optical wavelength. One filter configuration that provides increased optical area is the transverse configuration (hereinbefore previously referred to, and hereinafter to be described in detail) in which telluride oxide ($TeO_2$) is used as the birefringent crystal. First, telluride oxide has an extremely large figure of merit that results in reduced power need; and, secondly, the transverse configuration allows an extended acoustic path, and thereby can be used to achieve larger aperture without increase of drive power.

However, the usual geometry of a transverse configuration telluride oxide TAOF is not suitable for realizing high spectral resolution. In many applications, such as laser detection and identification, high spectral resolution is one of the most important requirements.

The basic difficulty of the usual geometry of a transverse configuration telluride oxide TAOF is that the minimum transverse dimension (hereinafter referred to as the "dead space") along the optical aperture is about one and one-half times that of the interaction length. This means that for high spectral resolution, the "dead space" (as well as the required crystal size) will be too large for practical purposes.

Furthermore, in the usual configuration of the transverse TAOF, a large transducer must be used to achieve high spectral resolution. The use of a large size transducer will make the impedance so low that it greatly increases the technical difficulty of providing adequate impedance matching.

Accordingly, it is fair and accurate to state that what is needed in the art and is not available is a tunable acousto-optic filter with improved spectral resolution and increased aperture.

SUMMARY OF THE INVENTION

The instant invention fulfills the aforementioned need and thereby constitutes a significant advance in the state-of-the-art.

According to the instant invention, an acoustic prism coupler member which is made of material of low acoustic velocity is fixedly positioned in abutting contact with the face of a transverse configuration crystal prism member, where the face is not traversed by the light beams, and where the prism angle of the transverse configuration crystal prism member is large, i.e., close to 90 degrees. The use of the acoustic prism coupler member, and of the large prism angle of the transverse configuration crystal prism member, reduces the aforementioned "dead space" and the size of the transducer, thereby simplifies the problem of impedance matching, and results in the practical realization of a high spectral resolution, large aperture TAOF which is useable even in the infrared region where said high spectral resolution and large aperture and are difficult to attain.

Therefore, it is an object of the instant invention to provide a tunable acousto-optic filter (TAOF) having high spectral resolution.

It is another object of this invention to provide a TAOF, as described above, which in addition has a large aperture, thereby permitting the TAOF to be practical for use in the infrared region.

It is still another object of the instant invention to provide a high spectral resolution, large aperture TAOF which is structured in a transverse configuration.

It is yet another object of this invention to use, as a constituent of the invention, a transverse configuration TAOF in which the crystal prism member is made of telluride oxide ($TeO_2$).

It is a further object of the instant invention to provide a transverse configuration TAOF in which a constituent is an acoustic prism coupler member which is made of material having a low acoustic velocity and which is in close (i.e., abutting) contact with a face of the aforesaid telluride oxide crystal prism member, where the face is not traversed by the light beams.

It is a still further object of this invention to provide a transverse configuration TAOF which is electronically tunable.

These objects of the instant invention, as well as other objects related thereto, will become readily apparent to a person of ordinary skill in the art after a consideration of the instant invention, coupled with reference to the contents of the Figures of the drawing.

DESCRIPTION OF THE PREFERRED EMBODIMENT

Figure 1:
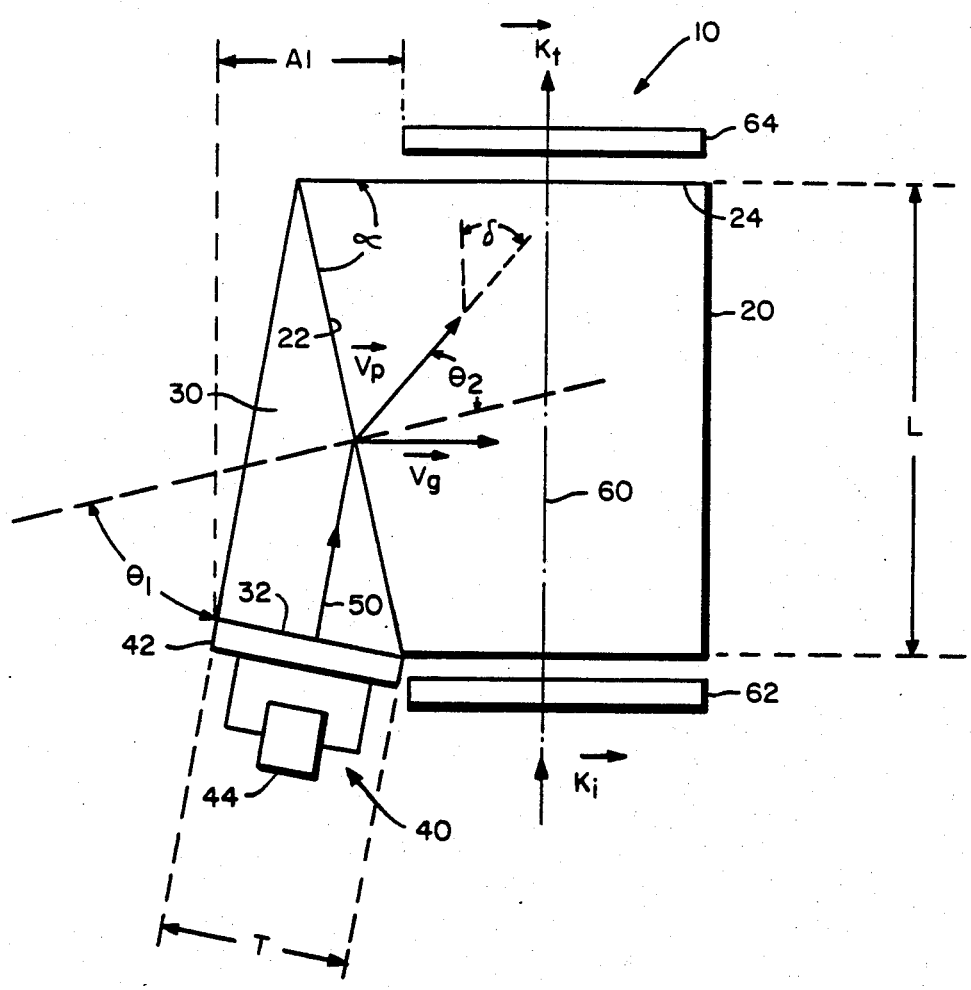
FIG. 1 is a representation in simplified pictorial form, and partially schematic, of the preferred embodiment of the instant invention.

With reference to FIG. 1, therein is shown, in simplified form, the preferred embodiment 10 of the instant invention, i.e., a tunable acousto-optic filter (TAOF) assembly with which high spectral resolution and large aperture are attainable. More specifically, the tunable acousto-optic filter of the present invention represents the type of optical filter that operates on the principle of acousto-optic diffraction wherein the tangents to the locus of the incident and diffracted light wavevectors are parallel.

It is to be remembered that the preferred embodiment 10 of the instant invention is for use with a beam of polarized light (such as is designated 60) which is transmitted through the inventive TAOF filter assembly 10. Although it is more strictly technically accurate to state that transmitted polarized light beams are involved (such as incident light beam $\vec{k_i}$ and exit diffracted light beam $\vec{k_t}$), for the purposes herein the singular term "light beam" (such as 60) will be used in the interet of simplicity.

In the most basic and generic structural form, the preferred embodiment 10 of the instant invention comprises: an acoustically anistropic, optically birefringent, crystal prism member 20 within optical face 24 through which the polarized light beam 60 is transmitted; an acoustic prism coupler member 30 which is made of a material low acoustic velocity and which is dipsosed in abutting (i.e., optical) contact with a face (such as 22) making a crystal prism angle $\alpha$ with respect to the optical face 24 of the crystal prism member 20; and means (generally designated 40), operably associated with the coupler member 30, for generating an acoustic wave (such as 50) in the coupler member 30 and in the crystal prism member 20, with the generated acoustic wave 50 transmitting through the interface 22 making an angle of incidence $\theta_1$ and an angle of refraction $\theta_2$, respectively, with the normal of the interface 22 ($\theta_1$ is also equal to the coupler prism angle between the interface 22 and the transducer face 32), and travelling in the crystal prism member 20 with its wavefront along the phase velocity $\vec{V_p}$ whereas its energy along the group velocity $\vec{V_g}$ in a direction perpendicular to the light beam 60, such that the acoustic wave 50 and the light beam 60 meet within the crystal prism member 20 and interact.

In an acoustically anisotropic crystal, the phase velocity $\vec{V_p}$ is, in general, not collinear with the group velocity $\vec{V_g}$ (i.e., energy velocity). It is the acoustic wave group velocity which is intended to be, and is, traveling in a direction perpendicular to the light beam 60 in the crystal prism member 20. The angle between the optical beam 60 and the acoustic phase velocity $\vec{V_p}$ is denoted as $\delta$, which is equal to 32.6° in the case when the crystal member 20 is made of telluride oxide ($TeO_2$).

As a matter of preference and not of limitation, the crystal prism member 20 is made of telluride oxide (Te $O_2$) which has an extremely low acoustic velocity, in addition to its other desired properties (i.e., acoustically anisotropic and optically birefringent).

Similarly as a matter of preference, the coupler member 30 is made of telluride oxide ($TeO_2$), or of $AsS_3$, or of GeAsSe, which have low acoustic velocity. Additionally, the coupler member 30 is held in abutting (optical) contact with the crystal prism member 20 at face 22 preferably by bonding.

Also as a matter of preference, the acoustic wave generating means 40 includes at least one acoustical (piezoelectric) transducer (such as 42) which is in abutting contact with a face (such as 32) of the coupler member 30. It is to be noted that the face 32 is not traversed by the light beam 60. The acoustic wave generating means 40 further includes a suitable radio frequency (RF) signal source (such as 44) in electrical connection with the piezoelectric transducer member 42.

Figure 2:
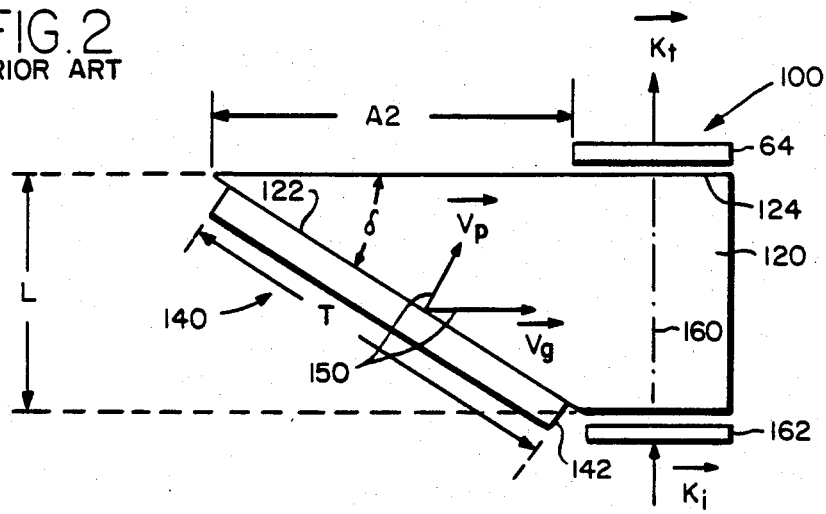
FIG. 2 is a similar representation of the typical prior art transverse configuration TAOF.

Now, with reference to FIG. 2, therein is shown a typical prior art transverse configuration TAOF 100, in simplified form. At first glance, the TAOF 100 appears to be somewhat similar to the preferred embodiment 10, FIG. 1, in that it includes a crystal prism member 120 with an optical face 124, an acoustic wave generating means 140 with a transducer 142, which is in abutting contact with the face 124 of the crystal prism member. The transducer face 122 is making an angle with respect to the optical face 124 and with the acoustic wave 50 (or, more accurately, the acoustic group velocity component thereof $\vec{V_g}$) travelling in a direction perpendicular to, and meeting with, the transmitted polarized light 160 in crystal prism member 120.

It is to be noted that both in the prior art transverse configuration TAOF 100, FIG. 2, and in the instant inventive TAOF 10, FIG. 1, the light beam 60, 160 is polarized by passing through a polarizer 62, 162. It then enters the crystal prism member 20, 120; travels through the crystal prism member 20, 120; is transmitted out of the opposite face of the crystal prism member 20, 120; and passes through an analyzer 64, 164.

However, it is also to be noticed that the "dead space" A2, FIG. 2, of the prior art TAOF 100 is much greater (i.e., longer) than the "dead space" A1, FIG. 1, of the preferred embodiment 10 of the inventive TAOF; and that the prism angle $\delta$ of the prior art TAOF 100, FIG. 2, is much smaller (i.e., 33 degrees) than the representative new prism angle $\alpha$ of the preferred embodiment 10 of the instant inventive TAOF, FIG. 1. Additionally, of course, the preferred embodiment 10 of the inventive TAOF includes a coupler member 30; whereas, the prior art TAOF 100 does not.

The improvement of the instant inventive TAOF 10 shown in FIG. 1 over the prior art TAOF 100 of FIG. 2 is best illustrated by the following example: consider the design of a transverse TeO$_2$ TAOF according to prior art. As shown in the prior art depicted in FIG. 2 of the drawing, the optical "dead space" is $A2 = L/\tan\delta = 1.54\ L$, and the transducer length is $T = L/\sin\delta = 1.83\ L$ where L is the interaction length. If, for example, L is chosen to be 2 cm (this corresponds to a moderate spectral length of 4 cm$^{-1}$), then $A2 = 3.1$ cm and $T = 3.7$ cm. Suppose that the height dimension (perpendicular to the paper) is $H = 1$ cm and the optical path is $L = 2$ cm, the minimum "dead space" will be 3.1 cm$^2$ and the minimum crystal size is 6.2 cm$^3$. The minimum transducer size is about 3.7 cm. At a center frequency of 40 MHz (the corresponding optical wavelength is 3 micrometers), the transducer impedance is about 2 ohms. To drive several watts of RF power into such a low impedance reactive load is extremely difficult.

Figure 4:
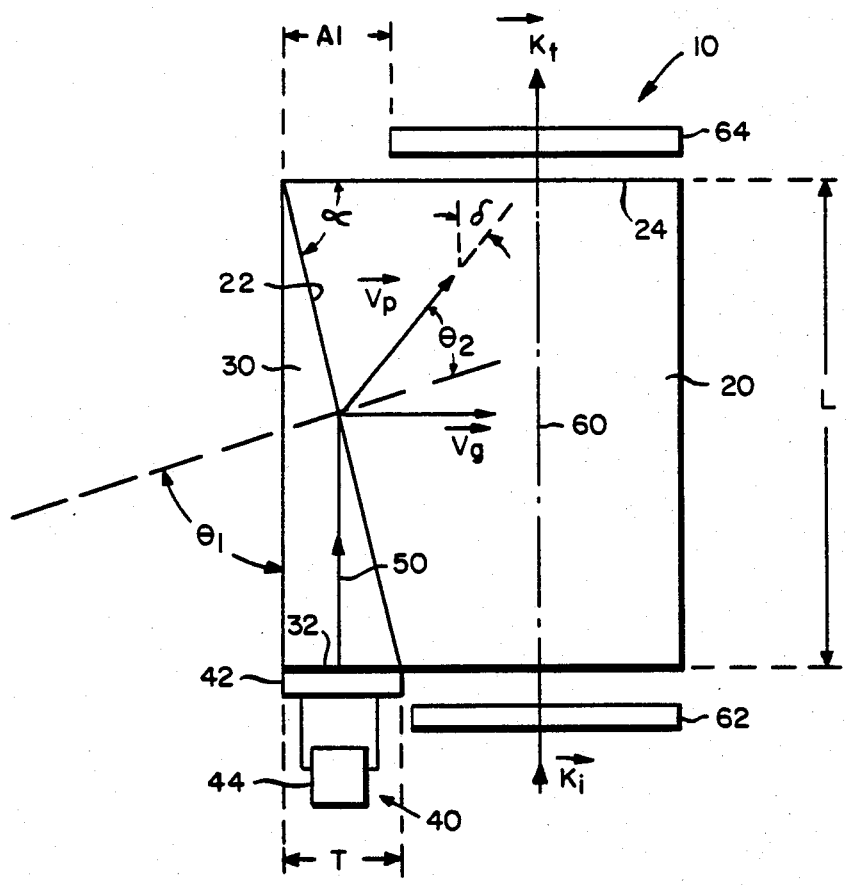
FIG. 4 is a representation in simplified pictorial form, and partially schematic, of a specific embodiment of the present invention.

Now consider a specific design of a transverse TAOF according to the instant invention. Referring to FIG. 4 of the drawing wherein identical reference numerals to those set forth in FIG. 1 of the drawing are utilized to designate similar elements, in the present invention a GeAsSe prism is used with one particular design choice wherein the transducer face of the coupler prism aligns with the optical face of the filter crystal, with face 24 angle chosen such that $\theta_1 = \alpha = 64°$. For the same optical path (and resolution), $L = 2$ cm, the "dead space" and transducer length (size) become $A1 = T = L/\tan\theta_1 = 2/\tan 64° \approx 1$ cm. The dead space (and also the crystal size) is reduced by a factor of 3.1 and the transducer size is reduced by a factor of 3.7. The corresponding transducer impedance is now 7.4 ohms, which can be impedance matched to a 50 ohm RF driver without too much difficulty.

Figure 3:
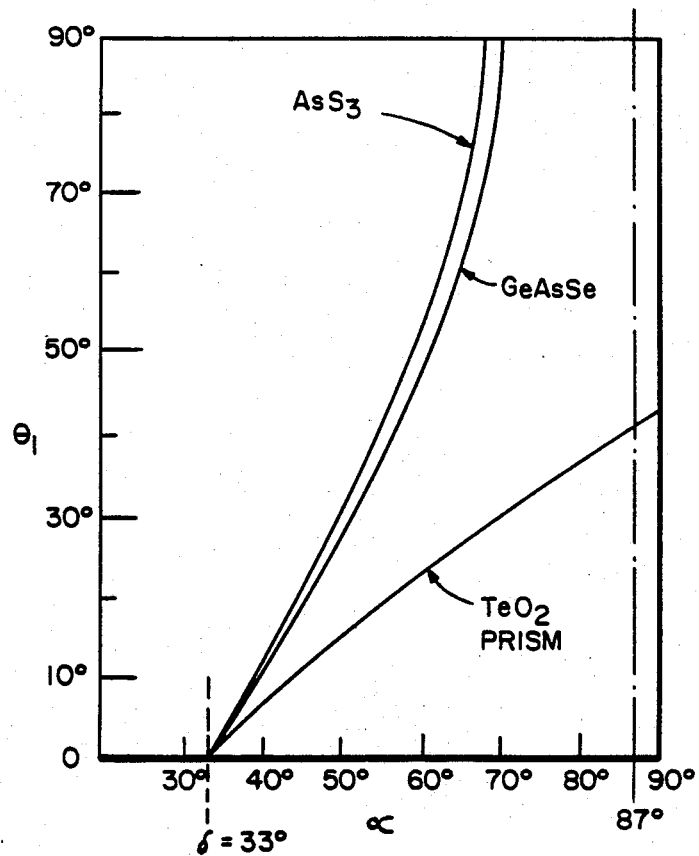
FIG. 3 is a representation, in graph form, of the plot of curves of three materials (i.e., $TeO_2$, $AsS_3$, and Ge As Se) against two axes (i.e., vertically, the acoustic angle $\theta_1$ for the acoustic prism coupler member of the invention; and, horizontally, the new prism angle $\alpha$ for the telluride oxide crystal prism member of the invention), whereby the graph can be used as a nomogram, when either $\theta_1$ or $\alpha$ is given or desired, to determine the other depemdent variable (i.e., $\alpha$ or $\theta_1$)

With reference to FIG. 3, therein is a graph of the curves of three materials (i.e., TeO$_2$, AsS$_3$, and GeAsSe) as plotted against two axes i.e., horizontally against the value of the new prism angle $\alpha$, FIG. 1, for the TeO$_2$ crystal prism member 20 of the instant invention; and, vertically, against the value of the coupler prism angle $\theta_1$, FIG. 1, for the acoustic prism coupler member 30 of the instant invention. The graph actually is, and can be used as, a nomograph (i.e., nomogram).

The graph shown in FIG. 3 is plotted according to the mathematical reation that is derived as follows. Referring to the transverse TAOF shown in FIG. 1, the angle of incidence $\theta_1$ and the angle of refraction $\theta_2$ are related by Snell's law, i.e., $$\sin\theta_1/V_1 = \sin\theta_2/V_2 \quad (1)$$

where V$_1$ and V$_2$ are the acoustic phase velocity in the coupler prism and crystal prism, respectively. Now, for the transverse TAOF configuration of the present invention shown in FIG. 1, $$\theta_2 = \alpha - \delta \quad (2)$$

where $\alpha$ is the crystal prism angle and $\delta$ is the angle between the optical beam and the acoustic phase velocity $\vec{V}_p$. Equations (1) and (2) yield $$\sin\theta_1 = V_1 \sin(\alpha - \delta)/V_2 \quad (3)$$

For a transverse TAOF using TeO$_2$ as the crystal prism material, $V_2 = 8 \times 10^4$ cm/sec, $\delta = 32.6°$, equation (3) becomes $$\theta_1 = \sin^{-1}[1.25(10^{-5}) \cdot V_1 \sin(\alpha - 32.6°)] \quad (4)$$

Equation (4) is plotted in FIG. 3 for three choices of coupler materials: TeO$_2$ (shear mode propagating along [110]), As$_2$S$_3$ and GeAsSe.

MANNER OF USE AND OF OPERATION OF THE PREFERRED EMBODIMENT

The manner of operation, and of use, of the preferred embodiment 10, FIG. 1, of the instant invention can be easily ascertained by any person of ordinary skill in the art from the foregoing description, coupled with reference to the contents of the Figures of the drawing. However, it will be of interest to those of ordinary skill in the art to know: that the difficulty in conceiving and reducing the instant inventive TAOF to actual practice was reminiscent of coupling light into a medium with a very large refractive index; that acoustic velocities and attenuation for the shear modes in several potential crystal prism member 20 materials with low velocities were measured using standard Bragg diffraction techniques; that the acoustic prism coupler member 30 of the preferred embodiment 10 was positioned and held in abutting contact with face 22 of the prism member 20 by bonding; and that the measured performance of the preferred embodiment 10 of the inventive tranverse configuration TAOF agreed with the theoretical predictions.

For others, it is sufficient to state: that the use of the coupler member 30, FIG. 1, reduced the "dead space" A2 of the usual transverse configuration TAOF 100, FIG. 2, by a factor of three; and, that the use of the coupler member 30, together with the increase of the prism angle of the crystal prism member 30, have made possible the practical realization of the high spectral resolution, large aperture, infrared - useable inventive TAOF 10, FIG. 1.

CONCLUSION

It is abundantly clear from all of the foregoing, and from the contents of the Figures of the drawing, that the stated objects of the instant invention, as well as other objects related thereto, have been achieved.

It is to be noted that, although there have been described and shown the fundamental and unique features of the instant invention, as applied to a preferred embodiment 10, nevertheless various other embodiments, variations, adaptations, substitutions, additions, and the like may occur to and can be made by those of ordinary skill in the art.

What is claimed is:

1. A tunable acousto-optic filter assembly having reduced optical dead space and transducer size, for use with a beam of polarized light transmitted therethrough in a predetermined direction, said assembly comprising:
   a. an acoustically anistropic, optically birefringent, crystal prism member which operates on the principle of acousto-optic diffraction wherein the tangents to the locus of incident and diffracted light wave vectors are parallel, said crystal prism member having a first face through which said light beam enters, a second face through which said light beam exits, and a third face of predetermined angular orientation with respect to said second face;

b. an acoustic prism coupler member, made of a material of low acoustic velocity, in abutting contact with said third face of said crystal prism member; and c. means, including an acoustical transducer, operably associated with said acoustic prism coupler member for generating an acoustic wave in said coupler member and in said crystal prism member such that said acoustic wave is transmitted through said third face of said crystal prism member such that the group velocity of said generated acoustic wave travels in said crystal prism member in a direction perpendicular to said predetermined direction of said light beam, and said acoustic wave and said light beam meet and interact within said crystal prism member, whereby said optical dead space and said transducer size of said filter assembly are thereby substantially reduced.

2. A tunable acousto-optic filter assembly, as set forth in claim 1 wherein said crystal prism member is made of telluride oxide.

3. A tunable acoustic-optic filter assembly, as set forth in claim 1 wherein said coupler member is made of telluride oxide.

4. A tunable acousto-optic filter assembly, as set forth in claim 1 wherein said coupler member is made of $AsS_3$.

5. A tunable acousto-optic filter assembly, as set forth in claim 1, wherein said coupler member is made of GeAsSe.

6. A tunable acousto-optic filter assembly, as set forth in claim 1 wherein said filter assembly is electrically tunable, and wherein said means for generating an acoustic wave in said coupler member further includes an RF signal source of electricity in electrical connection with said acoustical transducer.

7. A tunable acousto-optic filter assembly, as set forth in claim 1 wherein said acoustic prism coupler member is held in abutting contact with said face of said crystal prism member by bonding thereto.

8. A tunable acousto-optic filter assembly, as set forth in claim 1, wherein said second face is spaced apart a distance, L, from said first face, said predetermined angular orientation between said third face and said second face is defined as $\alpha$, said acoustic wave transmitted through said third face of said crystal prism makes an angle of incidence, $\theta_1$, with a normal to said third face, and $\theta_1$ is substantially equal to $\alpha$, wherein said optical dead space and transducer size, Al, is defined by the equation $Al = L/\tan\theta_1$.

* * * * *